United States Patent
Taniguchi

(10) Patent No.: US 12,401,234 B2
(45) Date of Patent: Aug. 26, 2025

(54) POWER SUPPLY APPARATUS

(71) Applicant: KABUSHIKI KAISHA TOSHIBA, Tokyo (JP)

(72) Inventor: Kentaro Taniguchi, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 41 days.

(21) Appl. No.: 18/215,051

(22) Filed: Jun. 27, 2023

(65) Prior Publication Data

US 2023/0344282 A1    Oct. 26, 2023

Related U.S. Application Data

(63) Continuation of application No. 17/014,383, filed on Sep. 8, 2020, now abandoned.

(30) Foreign Application Priority Data

Mar. 18, 2020    (JP) .................................. 2020-047795

(51) Int. Cl.
*H02J 50/80*    (2016.01)
*H02J 50/20*    (2016.01)
*H02J 50/40*    (2016.01)

(52) U.S. Cl.
CPC ............. *H02J 50/80* (2016.02); *H02J 50/20* (2016.02); *H02J 50/40* (2016.02)

(58) Field of Classification Search
CPC .. H02J 50/80; H02J 50/20; H02J 50/40; H02J 50/90
See application file for complete search history.

(56) References Cited

U.S. PATENT DOCUMENTS 9,912,380 B2 *    3/2018    Suzuki .................... H02J 50/12
9,973,237 B2 *    5/2018    Lee .......................... H04B 5/79
(Continued)

FOREIGN PATENT DOCUMENTS

WO    2013146929 A1    10/2013

OTHER PUBLICATIONS

Office Action (Final Rejection) dated Aug. 5, 2022, issued in parent U.S. Appl. No. 17/014,383.
(Continued)

*Primary Examiner* — Daniel Kessie
*Assistant Examiner* — Brian K Baxter
(74) *Attorney, Agent, or Firm* — Holtz, Holtz & Volek PC

(57) ABSTRACT

A power supply system includes a first power supply apparatus and a second power supply apparatus. The second power supply apparatus includes a power transmission controller and a receiver. The power transmission controller transmits a power transmission signal for power supply. The receiver receives information on a wireless system to which neither the first power supply apparatus nor the second power supply apparatus belongs from the first power supply apparatus. The power transmission controller determines at least one of a transmission time at which the power transmission signal is transmitted, a transmission direction in which the power transmission signal is transmitted, a power level of the power transmission signal, or a frequency of the power transmission signal, using the information on the wireless system, and transmits the power transmission signal based on this determination.

9 Claims, 11 Drawing Sheets

(56) References Cited

U.S. PATENT DOCUMENTS

| | | | |
|---|---|---|---|
| 10,770,925 | B2 | 9/2020 | Tandai et al. |
| 11,923,693 | B2 * | 3/2024 | Cheng ................... H02J 50/20 |
| 2010/0245173 | A1 * | 9/2010 | Honda ................ H04B 7/0617 |
| | | | 342/372 |
| 2015/0008736 | A1 | 1/2015 | Uchida et al. |
| 2015/0008876 | A1 * | 1/2015 | Kwak ................ H02J 7/00304 |
| | | | 320/108 |
| 2017/0117752 | A1 * | 4/2017 | Kaechi .................... H02J 50/60 |
| 2017/0141818 | A1 * | 5/2017 | Umeda ................... H04W 4/80 |
| 2018/0183259 | A1 * | 6/2018 | Lee ......................... H02J 50/90 |
| 2018/0226839 | A1 * | 8/2018 | Higaki ................. H02J 50/402 |
| 2018/0227017 | A1 * | 8/2018 | Lee ......................... H02J 50/80 |
| 2019/0006889 | A1 * | 1/2019 | Iwasaki ................. H02J 50/80 |
| 2019/0280534 | A1 * | 9/2019 | Park ....................... H02J 50/80 |
| 2019/0391620 | A1 * | 12/2019 | Matsuo ................ G06F 1/1683 |
| 2020/0021138 | A1 * | 1/2020 | Yeo ........................ H02J 50/12 |
| 2020/0044492 | A1 | 2/2020 | Taniguchi |
| 2020/0057474 | A1 * | 2/2020 | Pabbisetty .............. H02J 50/90 |
| 2020/0076239 | A1 * | 3/2020 | Taniguchi ............... H02J 50/80 |
| 2020/0185975 | A1 | 6/2020 | Taniguchi |
| 2021/0296935 | A1 * | 9/2021 | Taniguchi ............... H02J 50/70 |
| 2021/0377920 | A1 * | 12/2021 | Yan ....................... H04L 1/1671 |

OTHER PUBLICATIONS

Office Action (Final Rejection) dated Mar. 28, 2023, issued in parent U.S. Appl. No. 17/014,383.

Office Action (Non-Final Rejection) dated Dec. 17, 2021, issued in parent U.S. Appl. No. 17/014,383.

Office Action (Non-Final Rejection) dated Dec. 19, 2022, issued in parent U.S. Appl. No. 17/014,383.

U.S. Appl. No. 16/808,136; First Named Inventor: Kentaro Taniguchi; Title: "Electronic Device and Method"; Filed: Mar. 3, 2020.

U.S. Appl. No. 16/808,189; First Named Inventor: Kentaro Taniguchi; Title: "Electronic Device"; Filed: Mar. 3, 2020.

U.S. Appl. No. 16/816,169; First Named Inventor: Kentaro Taniguchi; Title: "Electronic Apparatus and Method "; Filed: Mar. 11, 2020.

U.S. Appl. No. 17/015,866; First Named Inventor: Kentaro Taniguchi; Title: "Electronic Apparatus, Power Supply System and Power Supply Control Method"; Filed: Sep. 9, 2020.

* cited by examiner

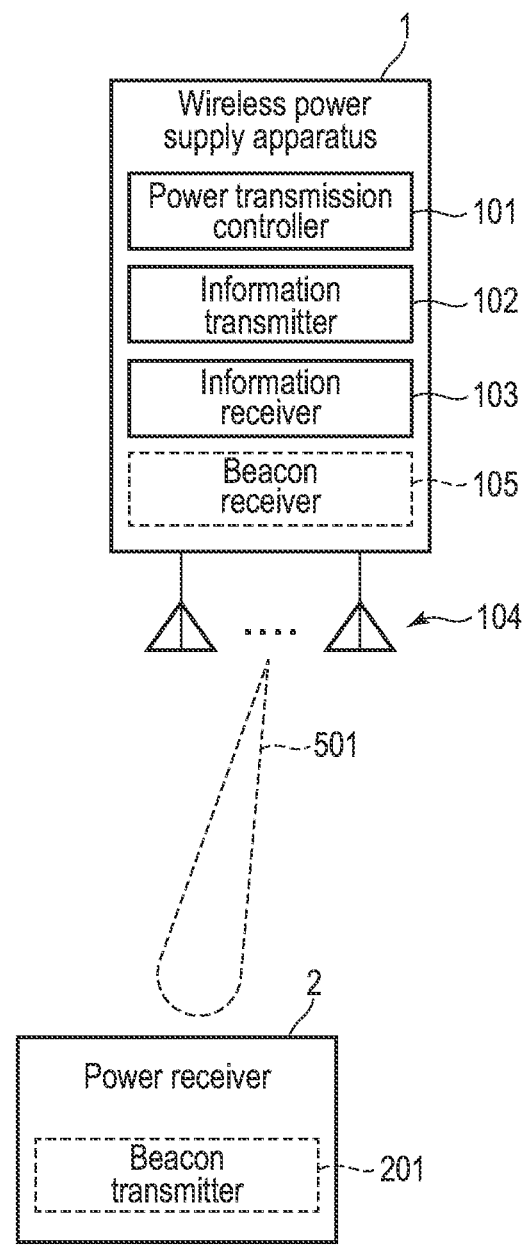
F I G. 1

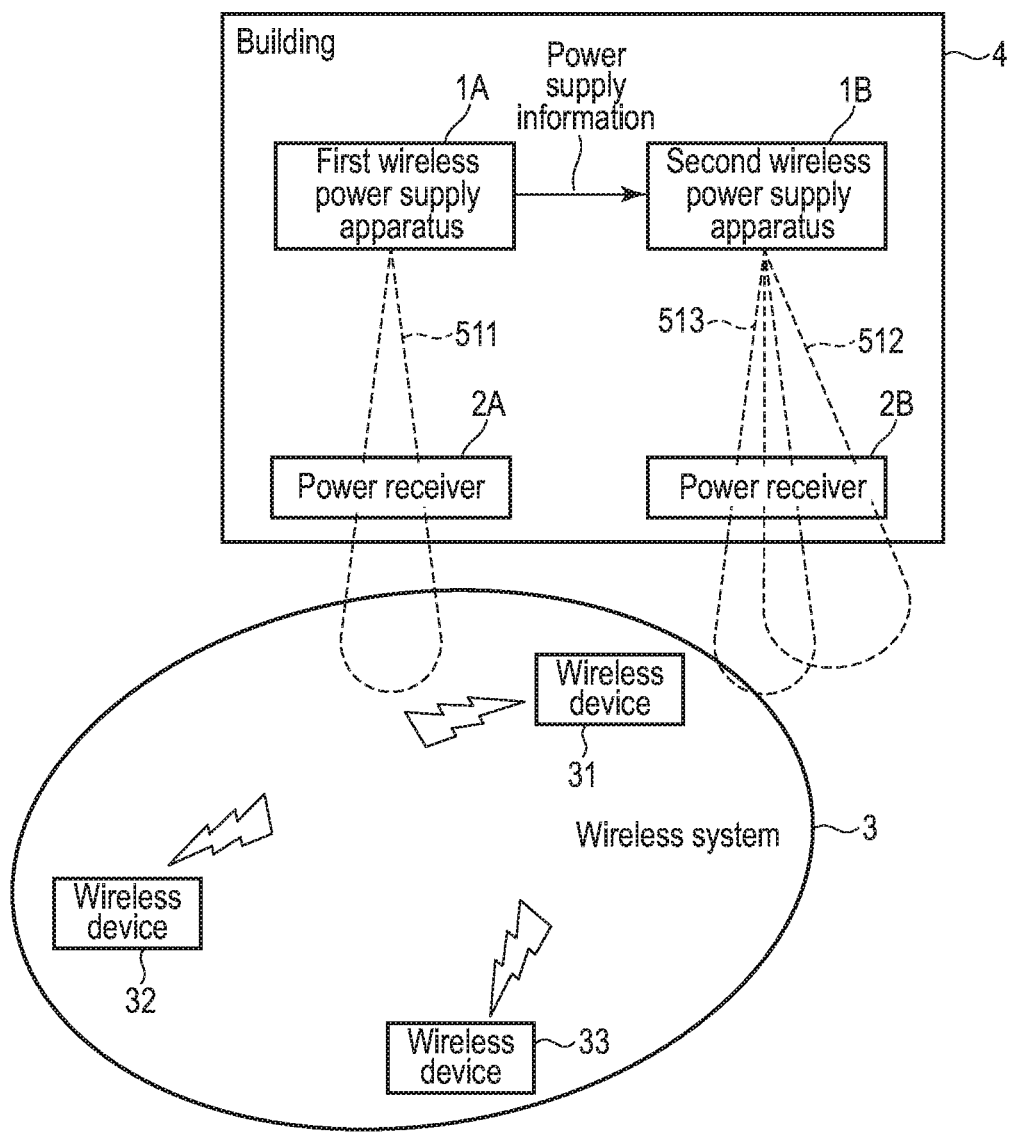
F I G. 3

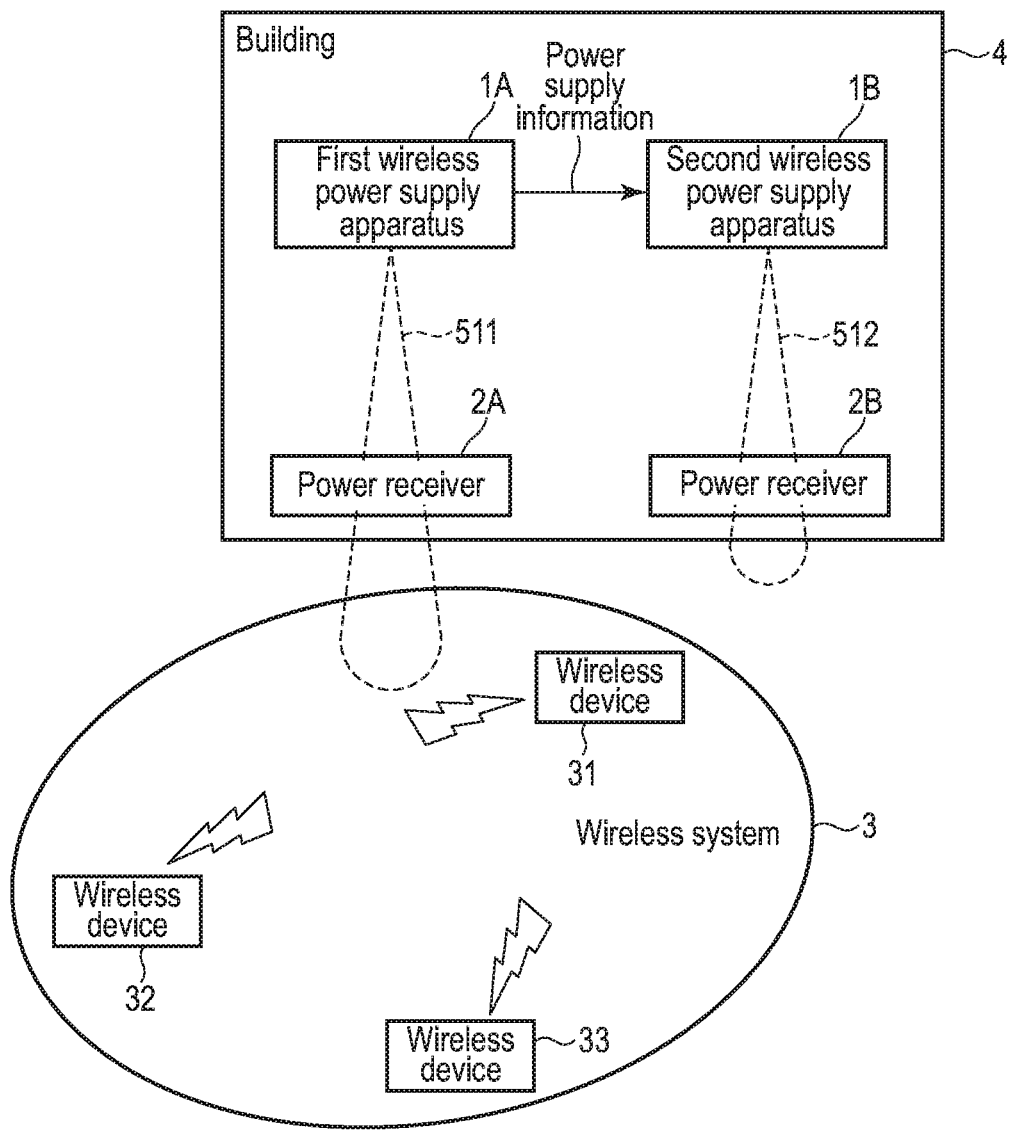
F I G. 5

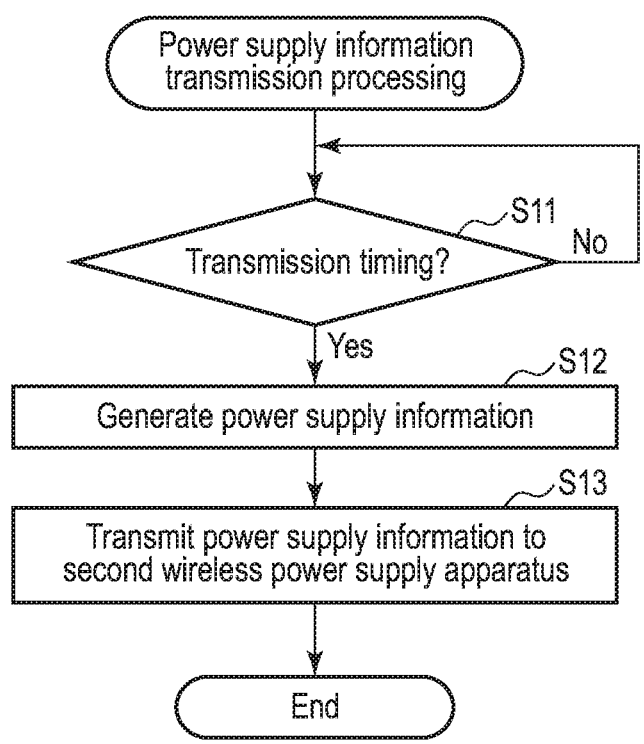
F I G. 6

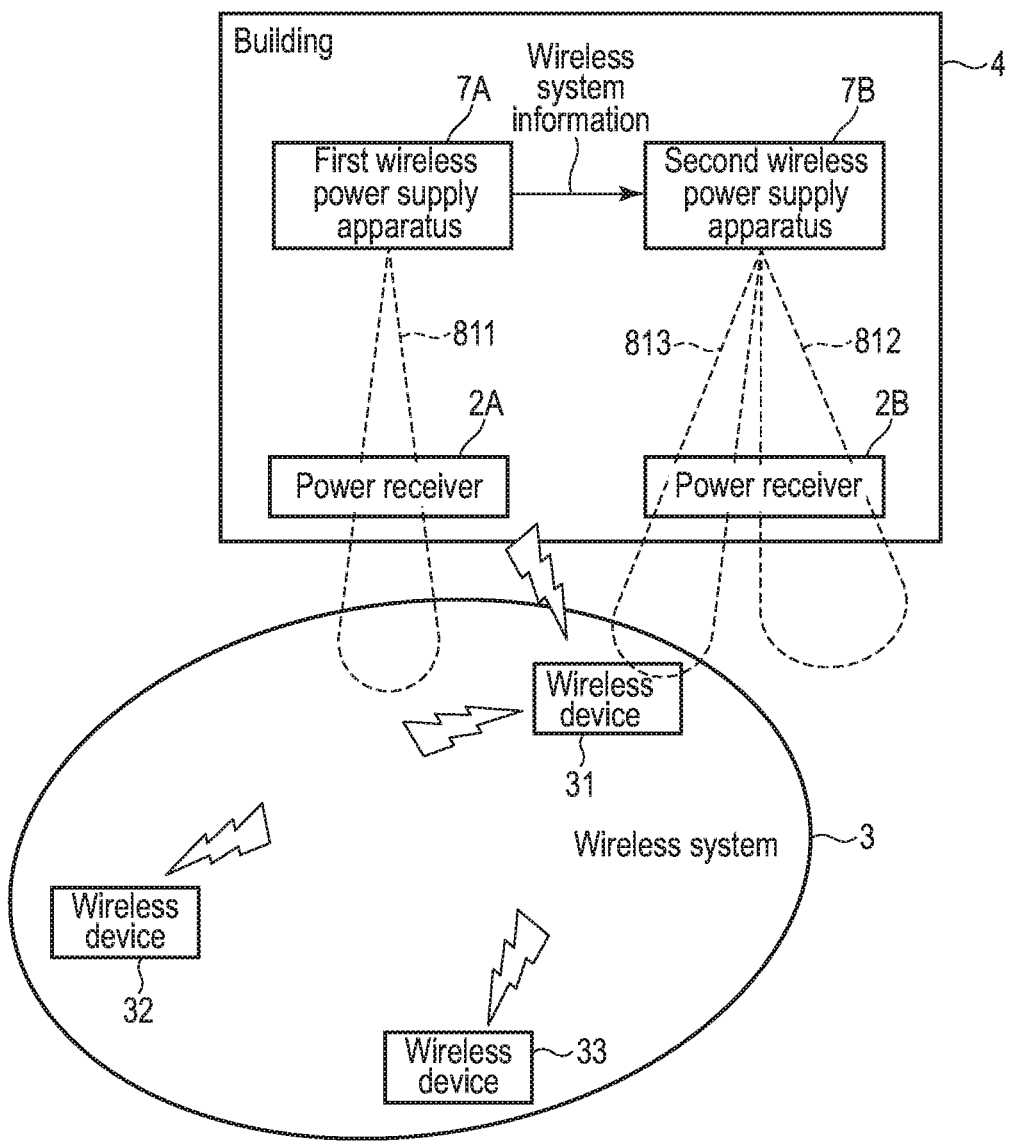
F I G. 9

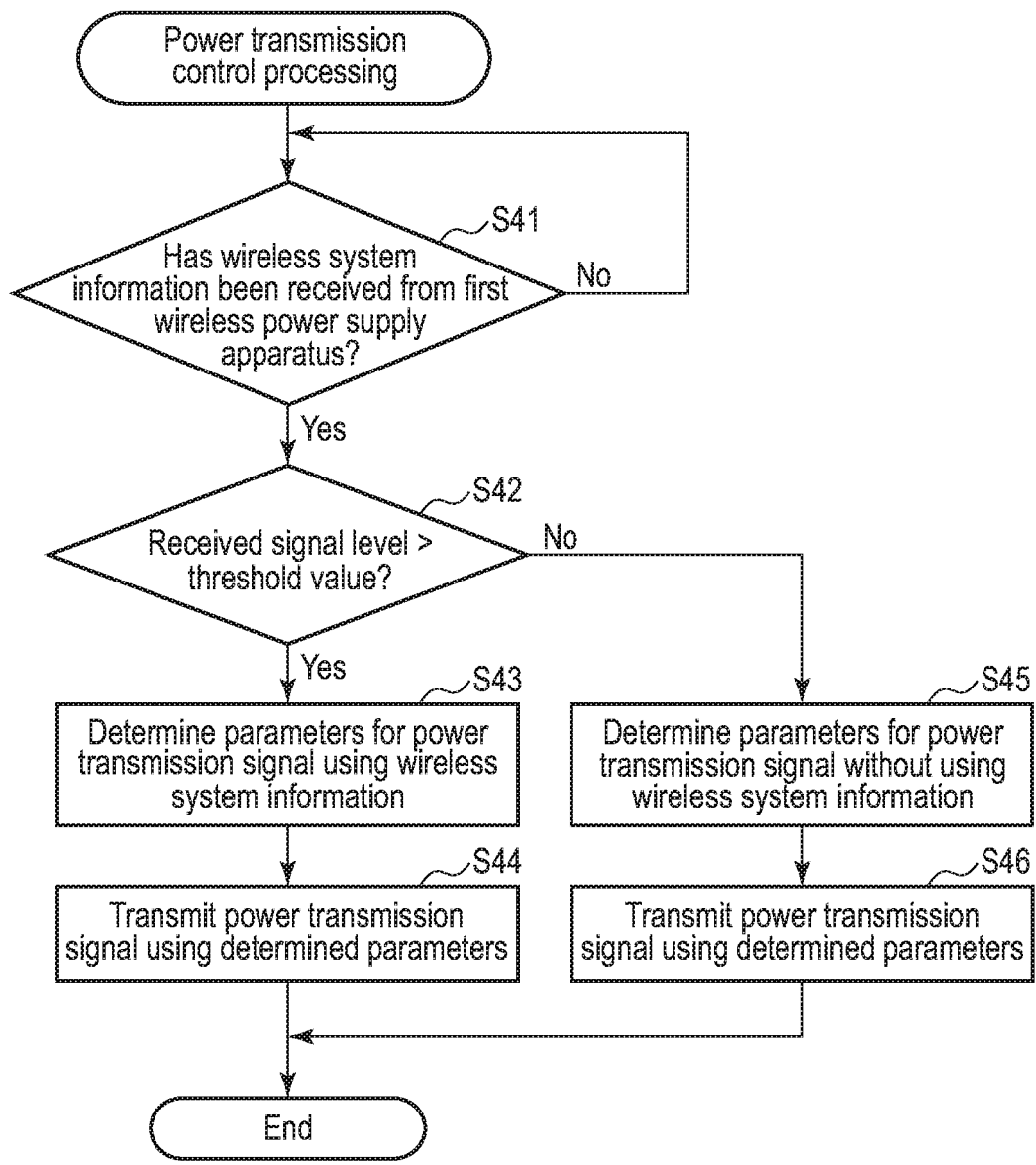
F I G. 11

POWER SUPPLY APPARATUS

CROSS-REFERENCE TO RELATED APPLICATIONS

This application is a Continuation Application of U.S. application Ser. No. 17/014,383, filed Sep. 8, 2020, which is based upon and claims the benefit of priority from Japanese Patent Application No. 2020-047795, filed Mar. 18, 2020, the entire contents all of which are incorporated herein by reference.

FIELD

Embodiments described herein relate generally to wireless power transmission.

BACKGROUND

Recently, wireless power supply apparatuses which wirelessly supply power using electromagnetic waves have been developed. The electromagnetic waves used for power supply by the wireless power supply apparatus have a higher transmission power or a higher equivalent isotropically radiated power (EIRP) than, for example, electromagnetic waves used for communication. Therefore, there is a high possibility of the electromagnetic waves of the wireless power supply apparatus having interference with electromagnetic waves of another wireless system.

In addition, in a case where multiple wireless power supply apparatuses are installed close to one another, power transmission signals emitted from the respective wireless power supply apparatuses are unintentionally synthesized and may interfere with another wireless system.

Therefore, it is necessary to realize a new function of reducing interference with another wireless system.

BRIEF DESCRIPTION OF THE DRAWINGS

FIG. 1 is a block diagram showing a configuration example of a power supply apparatus according to the first embodiment and a power receiver.

FIG. 3 is an illustration showing an example where the power supply apparatus of the embodiment controls the emission direction of the power transmission signal using power supply information.

FIG. 5 is an illustration showing an example where the power supply apparatus of the embodiment controls the power level of the power transmission signal using the power supply information.

FIG. 6 is a flowchart showing an example of the procedure of power supply information transmission processing executed in the power supply apparatus of the embodiment.

FIG. 9 is an illustration showing an example where the power supply apparatus of the embodiment controls the emission direction of a power transmission signal using wireless system information.

FIG. 11 is a flowchart showing an example of the procedure of power transmission control processing executed in the power supply apparatus of the embodiment.

DETAILED DESCRIPTION

Figure 2:
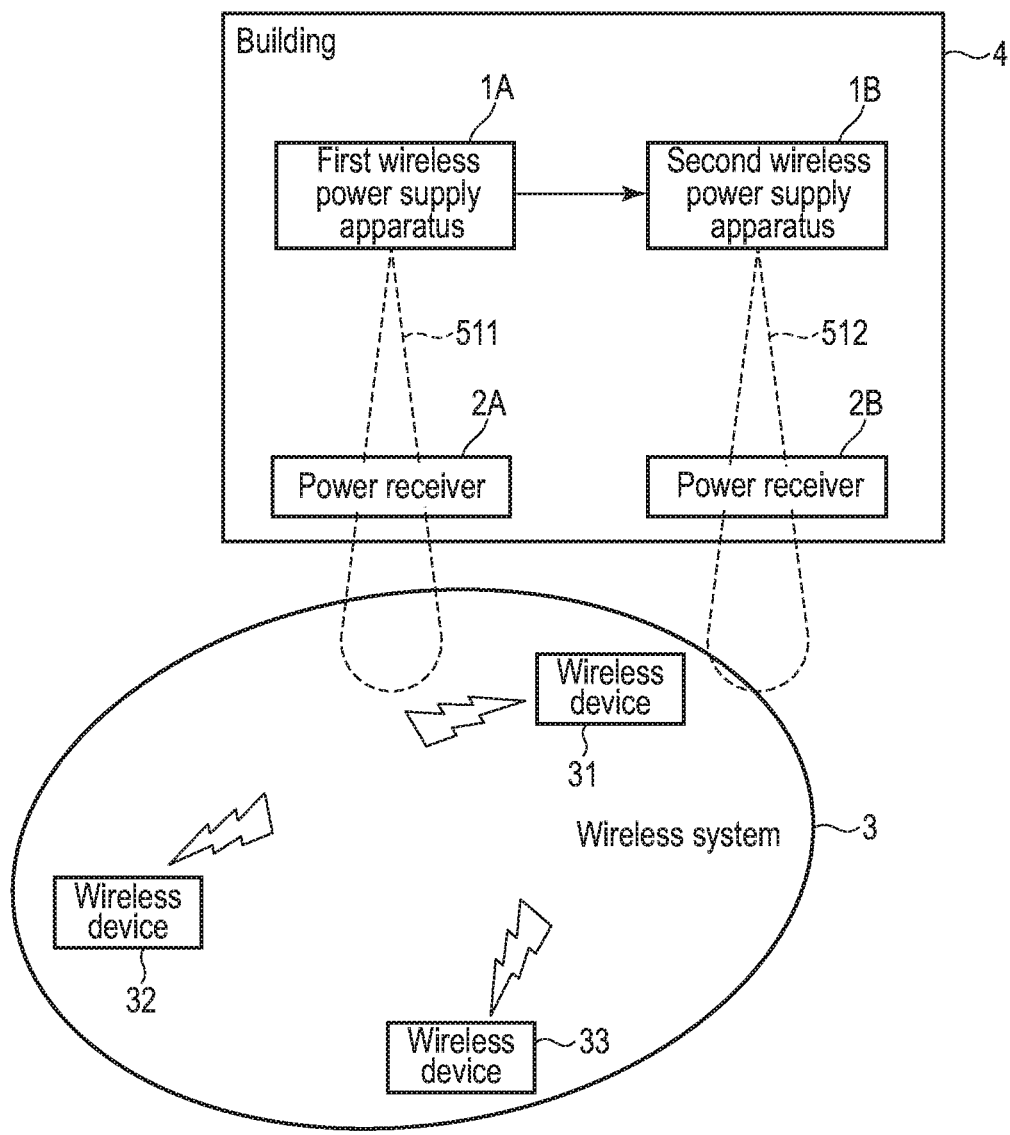
FIG. 2 is an illustration showing an example of power transmission signals (power supply beams) transmitted by multiple power supply apparatuses.

Embodiments will be described hereinafter with reference to the accompanying drawings.

In general, according to one embodiment, a power supply apparatus includes a power transmission controller and a receiver. The power transmission controller transmits a first power transmission signal for power supply. The receiver receives first information on a second power transmission signal from a first power supply apparatus. The second power transmission signal is transmitted by the first power supply apparatus for power supply. The power transmission controller determines at least one of a first time at which the first power transmission signal is transmitted, a first direction in which the first power transmission signal is transmitted, or a first power level of the first power transmission signal, using the first information, and transmits the first power transmission signal based on the determined at least one of the first time, the first direction, or the first power level.

First Embodiment

First, a configuration example of a power supply apparatus according to a first embodiment will be explained with reference to FIG. 1. The power supply apparatus is a wireless power supply apparatus 1 which wirelessly supplies power using electromagnetic waves. The electromagnetic waves are equivalent to a wireless signal for power supply (hereinafter referred to also as a power transmission signal). The wireless power supply apparatus 1 transmits a power transmission signal to a power receiver 2 which exists in a power supply area in which the power transmission signal can reach. The power transmission signal is formed as an electromagnetic wave beam emitted to the power receiver 2. The electromagnetic wave beam forming the power transmission signal will be hereinafter referred to also as a power supply beam. Note that the wireless power supply apparatus 1 may transmit the power transmission signal to multiple power receivers 2.

The power receiver 2 comprises a circuit or the like for receiving the power transmission signal. As the power receiver 2 receives the power transmission signal transmitted by the wireless power supply apparatus 1, power is supplied to the power receiver 2.

The power transmission signal is equivalent to electromagnetic waves having a specific frequency. Therefore, in a case where there is another wireless system using the same or close frequency around, the power transmission signal may interfere with a wireless signal exchanged (i.e., transmitted and received) in the wireless system. In order to avoid such interference, the wireless power supply apparatus 1 is preferably installed and operated in an indoor environment in which it is confirmed that there is no other wireless system around.

However, when the wireless power supply apparatus 1 is installed in a real environment, multiple wireless power supply apparatuses 1 may be installed close to one another. In such a case, power transmission signals (power supply beams) emitted from the respective wireless power supply apparatuses 1 are unintentionally synthesized and may interfere with another wireless system. That is, the wireless power supply apparatus 1 may become an interfering device which interferes with the other wireless system, and the other wireless system may become an interfered system which is interfered with by the wireless power supply apparatus 1.

Therefore, the wireless power supply apparatus 1 of the present embodiment transmits power supply information on a power transmission signal to be transmitted to another wireless power supply apparatus 1 or controls the power transmission signal using power supply information obtained from another wireless power supply apparatus. Accordingly, it is possible to avoid or reduce the unintentional interference of the power transmission signals, which are transmitted by the wireless power supply apparatuses 1, with another wireless system 3.

As shown in FIG. 1, the wireless power supply apparatus 1 comprises a power transmission controller 101, an information transmitter 102, an information receiver 103, and one or more antennas 104. The wireless power supply apparatus 1 may further comprise a beacon receiver 105. Each of these units may be realized as, for example, a circuit. The power transmission controller 101, the information transmitter 102, the information receiver 103, and the beacon receiver 105 may be disposed in one chip or different chips.

The power transmission controller 101 controls a power transmission signal 501 for supplying power to the power receiver 2. The power transmission controller 101 transmits the power transmission signal 501 via the antennas 104. The power transmission signal 501 is equivalent to a power supply beam formed for the power receiver 2. The power transmission signal 501 may be formed as a beam having high directivity for the power receiver 2 or a wide beam (that is, having low directivity). Alternatively, the power transmission signal 501 may be formed as two or more branch beams. The power transmission controller 101 may supply power to multiple power receivers 2 by using, for example, a wide power supply beam or two or more branch power supply beams.

Note that a position or direction where the power receiver 2 exists is or both the position and direction are known in some cases and unknown in other cases in the wireless power supply apparatus 1. In a case where at least one of the position and direction of the power receiver 2 is known, the power transmission controller 101 transmits the power transmission signal 501 to the position (or direction). That is, the power transmission controller 101 emits the power supply beam forming the power transmission signal 501 to the position (or direction).

On the other hand, in a case where both of the position and direction of the power receiver 2 are unknown, a beacon transmitter 201 disposed in the power receiver 2 transmits a beacon signal. The beacon receiver 105 of the wireless power supply apparatus 1 receives this beacon signal. The power transmission controller 101 analyzes the reception result of the beacon signal, and estimates the propagation environment between the power receiver 2 and the wireless power supply apparatus 1. The power transmission controller 101 estimates, for example, a direction from which the beacon signal arrives. Then, the power transmission controller 101 forms the power transmission signal (power supply beam) 501 based on the estimation result.

The information transmitter 102 and the information receiver 103 perform wireless communication with another wireless power supply apparatus 1 via the antenna 104. The information transmitter 102 and the information receiver 103 may establish a connection with another wireless power supply apparatus 1 beforehand or when communication is needed. Bluetooth (registered trademark), a wireless local area network (LAN), or specified low power radio may be used for this wireless communication. Note that the antenna 104 used for the transmission of the power transmission signal 501 by the power transmission controller 101 and the antenna 104 used for the communication by the information transmitter 102 and the information receiver 103 may be the same as each other or different from each other. Furthermore, the information transmitter 102 and the information receiver 103 may perform wired communication (for example, communication of a wired LAN) with another wireless power supply apparatus 1. A case where two wireless power supply apparatuses 1 perform wireless communication will be exemplified below.

The information transmitter 102 transmits first power supply information on the power transmission signal 501 to the other wireless power supply apparatus 1 via the antenna 104. The information transmitter 102 may transmit the first power supply information regularly or in accordance with a specific trigger (for example, a request by the other wireless power supply apparatus 1). The first power supply information includes a time at which the power transmission signal 501 is transmitted, a direction in which the power transmission signal 501 is transmitted, the power level (that is, power value) of the power transmission signal 501, and the like. The other wireless power supply apparatus 1 may receive the first power supply information and control a power transmission signal using the received first power supply information.

The information receiver 103 receives second power supply information on a power transmission signal, which is transmitted by the other wireless power supply apparatus 1 for power supply, from the other wireless power supply apparatus 1 via the antennas 104.

The power transmission controller 101 determines parameters for the power transmission signal 501 using the received second power supply information. The power transmission controller 101 may change parameters which have been used or determine that the parameters should not be changed, using the second power supply information. The power transmission controller 101 determines, for example, at least one of a first time at which the power transmission signal 501 is transmitted, a first direction in which the power transmission signal 501 is transmitted, and a first power level of the power transmission signal 501. Then, the power transmission controller 101 transmits the power transmission signal 501 based on the determined at least one of the first time, the first direction and the first power level. That is, the power transmission controller 101 forms the power supply beam which is equivalent to the power transmission signal 501 on the basis of the determined at least one of first time, the first direction and the first power level.

FIG. 2 shows an example of power transmission signals transmitted by wireless power supply apparatuses 1A and 1B in a case where power supply information is not used. The first wireless power supply apparatus 1A transmits a first power transmission signal 511 to supply power to a power receiver 2A. That is, the first wireless power supply apparatus 1A emits a power supply beam forming the first power transmission signal 511, to the power receiver 2A.

In addition, the second wireless power supply apparatus 1B transmits a second power transmission signal 512 to supply power to a power receiver 2B. That is, the second wireless power supply apparatus 1B emits a power supply beam forming the second power transmission signal 512, to the power receiver 2B.

In a case where the wireless power supply apparatus 1A and the wireless power supply apparatus 1B operate independently of each other, the first power transmission signal 511 and the second power transmission signal 512 may be transmitted in similar directions. In addition, another wireless system 3 may exists on the extensions of these directions.

The wireless system 3 is composed of, for example, multiple wireless devices 31, 32 and 33 which may transmit and receive wireless signals. The wireless system 3 is a system of various types which transfers (i.e., exchanges) a wireless signal in the frequency band of the power transmission signals 511 and 512 or a frequency band close to it. The wireless system 3 may be a system for a wireless LAN, an electronic toll collection system (ETC), broadcast, a meteorological radar, amateur radio, satellite communication, a robot (for example, a drone), a portable phone, or the like.

When having low power levels but emitted in similar directions, the power transmission signals 511 and 512 transmitted by the wireless power supply apparatus 1A and the wireless power supply apparatus 1B may form interfering waves having a high power level and have a significant interference with the wireless system 3. Because of this interference, the wireless system 3 may not be able to transfer a wireless signal correctly.

In the present embodiment, the wireless power supply apparatuses 1A and 1B have configurations substantially the same as the wireless power supply apparatus 1 described above with reference to FIG. 1. That is, each of the wireless power supply apparatuses 1A and 1B has communication functions and transmits power supply information to wireless power supply apparatuses around it. Then, each of the wireless power supply apparatuses 1A and 1B controls the power transmission signals 511 or 512 using the received power supply information. Accordingly, the wireless power supply apparatuses 1A and 1B can avoid or reduce unintentional interference with the other wireless system 3.

FIG. 3 shows an example where the second wireless power supply apparatus 1B uses the power supply information, which is transmitted by the first wireless power supply apparatus 1A, in order to control the emission direction of the second power transmission signal 512.

The information transmitter 102 of the first wireless power supply apparatus 1A transmits power supply information, which includes direction information indicative of a direction in which the first power transmission signal 511 is transmitted (that is, an emission direction), to the second wireless power supply apparatus 1B. The information transmitter 102 transmits the power supply information to the second wireless power supply apparatus 1B, for example, before the second wireless power supply apparatus 1B starts power supply (that is, transmission of the second power transmission signal 512).

The direction information may indicate, for example, an azimuth angle from 1 degree to 360 degrees with reference to the north or an azimuth angle in radians. The direction information may further indicate, for example, an elevation angle from −90 degrees to 90 degrees with reference to the horizontal direction.

Alternatively, the direction information may indicate the position (for example, coordinate information) of the first wireless power supply apparatus 1A and the position of the power receiver 2A. The second wireless power supply apparatus 1B may estimate the emission direction of the first power transmission signal 511 by the first wireless power supply apparatus 1A on the basis of the position of the first wireless power supply apparatus 1A and the position of the power receiver 2A.

The information receiver 103 of the second wireless power supply apparatus 1B receives the power supply information from the first wireless power supply apparatus 1A. The power transmission controller 101 of the second wireless power supply apparatus 1B determines the emission direction of the second power transmission signal 512 such that the emission direction of the second power transmission signal 512 becomes different from the emission direction of the first power transmission signal 511, using the direction information included in the received power supply information. Then, the power transmission controller 101 transmits the second power transmission signal 512 in the determined emission direction.

Since the first wireless power supply apparatus 1A and the second wireless power supply apparatus 1B transmit the power transmission signals 511 and 512 having different emission directions, as compared with a case where the power transmission signals 511 and 513 having the same emission direction are transmitted, unintentional interference with the other wireless system 3 can be reduced or avoided.

Note that, from the perspective of supplying as high energy as possible to the power receivers 2A and 2B by the power transmission signals 511 and 512, depending on the position of the power receiver 2B, the first power transmission signal 511 and the second power transmission signal 512 preferably have the same emission direction. In such a case, the power transmission controller 101 of the second wireless power supply apparatus 1B determines the emission direction of the second power transmission signal 512 which is shifted slightly (for example, shifted at several degrees) from the emission direction of the first power transmission signal 511 so that the emission direction of the second power transmission signal 512 will not perfectly match the emission direction of the first power transmission signal 511. Alternatively, the power transmission controller 101 may determine the emission direction of the second power transmission signal 512 such that the emission direction of the second power transmission signal 512 becomes different from the emission direction of the first power transmission signal 511, and may expand the coverage of the second power transmission signal 512 by decreasing the directivity of the second power transmission signal 512 (that is, the directivity of the power supply beam forming the second power transmission signal 512). Accordingly, even when the emission direction of the second power transmission signal 512 is shifted from the direction toward the power receiver 2B, the second wireless power supply apparatus 1B can still supply power to the power receiver 2B.

Note that the information transmitter 102 of the second wireless power supply apparatus 1B may further transmit power supply information, which includes direction information indicative of a direction in which the second power transmission signal 512 is transmitted, to another wireless power supply apparatus 1. The other wireless power supply apparatus 1 may similarly control a power transmission signal using the power supply information.

Figure 4:
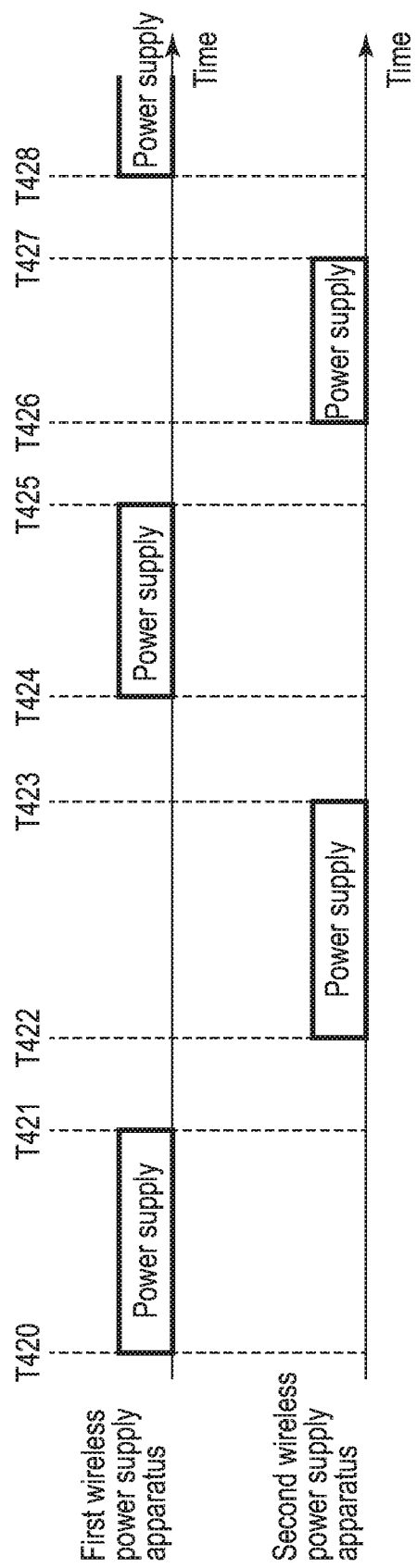
FIG. 4 is an illustration showing an example where the power supply apparatus of the embodiment controls the transmission time of the power transmission signal using the power supply information.

FIG. 4 shows an example where the second wireless power supply apparatus 1B uses the power supply information transmitted by the first wireless power supply apparatus 1A in order to control the transmission time (transmission timing) of the second power transmission signal 512.

The information transmitter 102 of the first wireless power supply apparatus 1A transmits power supply information, which includes time information on a time at which the first power transmission signal 511 is transmitted, to the second wireless power supply apparatus 1B. The information transmitter 102 transmits the power supply information to the second wireless power supply apparatus 1B, for example, before the second wireless power supply apparatus 1B starts power supply (that is, transmission of the second power transmission signal 512). The time information indicates, for example, at least one of a power supply start time, a power supply end time, a power supply continuation time, a power supply frequency, and a suspension time.

The information receiver 103 of the second wireless power supply apparatus 1B receives the power supply information from the first wireless power supply apparatus 1A. The power transmission controller 101 of the second wireless power supply apparatus 1B determines the transmission time of the second power transmission signal 512 such that the transmission time of the second power transmission signal 512 does not overlap a time at which the first power transmission signal 511 is transmitted at all or does not overlap a time at which the first power transmission signal 511 is transmitted so much, using the time information included in the received power supply information. That is, the power transmission controller 101 determines the transmission time of the second power transmission signal 512 such that at least a part of the transmission time of the second power transmission signal 512 does not overlap a time at which the first power transmission signal 511 is transmitted. Then, the power transmission controller 101 transmits the second power transmission signal 512 at the determined transmission time.

In the example shown in FIG. 4, the first wireless power supply apparatus 1A starts transmission of the first power transmission signal 511 (that is, power supply) at a time T420, and ends transmission of the first power transmission signal 511 at a time T421. After that, the first wireless power supply apparatus 1A starts transmission of the first power transmission signal 511 at a time T424, and ends transmission of the first power transmission signal 511 at a time T425. Furthermore, the first wireless power supply apparatus 1A starts transmission of the first power transmission signal 511 at a time T428. Therefore, the time T420, the time T424 and the time T428 are the power supply start times of the first wireless power supply apparatus 1A. In addition, the time T421 and the time T425 are the power supply end times of the first wireless power supply apparatus 1A.

Note that a period of time from the power supply start time T420 to the power supply end time T421 in which the first power transmission signal 511 is transmitted, and a period of time from the power supply start time T424 to the power supply end time T425 in which the first power transmission signal 511 is transmitted are referred to as power supply periods. The length of each power supply period is referred to as a power supply continuation time.

In addition, a period of time from the power supply end time T421 to the power supply start time T424 in which the first power transmission signal 511 is not transmitted, and a period of time from the power supply end time T425 to the power supply start time 1428 in which the first power transmission signal 511 is not transmitted are referred to as suspension periods. The length of each suspension period is referred to as a suspension time.

Some examples where the second wireless power supply apparatus 1B uses the power supply information, which includes the time information and is received from the first wireless power supply apparatus 1A, in order to control the transmission time of the second power transmission signal 512 will be explained.

(1) Case where Time Information Indicative of Power Supply Start Times 1420 and 1424 is Transmitted from First Wireless Power Supply Apparatus 1A to Second Wireless Power Supply Apparatus 1B The power transmission controller 101 of the second wireless power supply apparatus 1B determines power supply start times 1422 and 1426 which are different from the power supply start times 1420 and 1424 indicated in the time information. Then, the power transmission controller 101 starts transmission of the second power transmission signal 512 at the power supply start times 1422 and 1426. Accordingly, the power supply period of the second wireless power supply apparatus 1B is prevented from matching the power supply period of the first wireless power supply apparatus 1A. Alternatively, even if the power supply periods match each other for a short period of time, the power supply periods are prevented from overlapping each other for a long period of time. Therefore, it is possible to reduce the risk of the interference with the wireless system 3 when the power transmission signals 511 and 512 are transmitted in an overlapping manner.

(2) Case where Time Information Indicative of Power Supply End Times 1421 and 1425 is Transmitted from First Wireless Power Supply Apparatus 1A to Second Wireless Power Supply Apparatus 1B The power transmission controller 101 of the second wireless power supply apparatus 1B determines power supply start times 1422 and 1426 which are later than the power supply end times 1421 and 1425 indicated in the time information. Then, the power transmission controller 101 starts transmission of the second power transmission signal 512 at the power supply start times 1422 and 1426. Accordingly, the power supply period of the second wireless power supply apparatus 1B is prevented from overlapping the power supply period of the first wireless power supply apparatus 1A for a long period of time. Therefore, it is possible to reduce the risk of the interference with the wireless system 3 when the power transmission signals 511 and 512 are transmitted in an overlapping manner.

(3) Case where Time Information Indicative of Power Supply Periods T420-T421 and T424-T425 is Transmitted from First Wireless Power Supply Apparatus 1A to Second Wireless Power Supply Apparatus 1B The information transmitter 102 of the first wireless power supply apparatus 1A transmits, to the second wireless power supply apparatus 1B, time information indicative of a combination of the power supply start time 1420 and a period of time from the power supply start time 1420 to the power supply end time 1421 (that is, the power supply continuation time) and a combination of the power supply start time 1424 and a period of time from the power supply start time 1424 to the power supply end time 1425. Alternatively, the information transmitter 102 may transmit, to the second wireless power supply apparatus 1B, time information indicative of a combination of the power supply start time 1420 and the power supply end time 1421 and a combination of the power supply start time 1424 and the power supply end time 1425.

The power transmission controller 101 of the second wireless power supply apparatus 1B can accurately obtain the power supply periods T420-T421 and T424-T425 of the first wireless power supply apparatus 1A using such time information. The power transmission controller 101 determines power supply periods T422-T423 and T426-T427 such that the power supply periods T422-T423 and T426-T427 do not overlap the power supply periods T420-T421 and T424-T425. Accordingly, the power supply periods T422-T423 and T426-T427 of the second wireless power supply apparatus 1B are prevented from overlapping the power supply periods T420-T421 and T424-T425 of the first wireless power supply apparatus 1A. Therefore, it is possible to reduce the risk of the interference with the wireless system 3 when the power transmission signals 511 and 512 are transmitted in an overlapping manner.

(4) Case where Time Information Indicative of Suspension Periods is Transmitted from First Wireless Power Supply Apparatus 1A to Second Wireless Power Supply Apparatus 1B

As described above, the suspension period is a period of time in which the power transmission signal is not transmitted. The information transmitter 102 of the first wireless power supply apparatus 1A transmits, to the second wireless power supply apparatus 1B, time information indicative of a combination of the power supply end time T421 and a period of time from the power supply end time T421 to the next power supply start time T424 (that is, the suspension time) and a combination of the power supply end time T425 and a period of time from the power supply end time T425 to the next power supply start time T428. Alternatively, the information transmitter 102 may transmit, to the second wireless power supply apparatus 1B, time information indicative of a combination of the power supply end time T421 and the next power supply start time T424 and a combination of the power supply end time T425 and the next power supply start time T428.

The power transmission controller 101 of the second wireless power supply apparatus 1B can accurately obtain the suspension periods T421-T424 and T425-T428 of the first wireless power supply apparatus 1A using such time information. The power transmission controller 101 determines power supply periods T422-T423 and T426-T427 such that the power supply periods T422-T423 and T426-T427 are included in the suspension periods T421-T424 and T425-T428, respectively. Accordingly, the power supply periods T422-T423 and T426-T427 of the second wireless power supply apparatus 1B are prevented from overlapping the power supply periods T420-T421 and T424-T425 of the first wireless power supply apparatus 1A, respectively. Therefore, it is possible to reduce the risk of the interference with the wireless system 3 when the power transmission signals 511 and 512 are transmitted in an overlapping manner.

(5) Case where Time Information Indicative of Power Supply Frequency is Transmitted from First Wireless Power Supply Apparatus 1A to Second Wireless Power Supply Apparatus 1B

The power supply frequency of the first wireless power supply apparatus 1A is expressed by the ratio of the power supply periods T420-T421 and T424-T425 of the first wireless power supply apparatus 1A to a whole period of time in which the power transmission signals 511 and 512 are controlled.

The power transmission controller 101 of the second wireless power supply apparatus 1B determines the power supply frequency of the second power transmission signal 512 in accordance with the power supply frequency of the first wireless power supply apparatus 1A indicated in the time information. More specifically, if the power supply frequency of the first wireless power supply apparatus 1A exceeds a threshold value, the power transmission controller 101 determines that a first value is set as the power supply frequency of the second power transmission signal 512. On the other hand, if the power supply frequency of the first wireless power supply apparatus 1A is less than or equal to the threshold value, the power transmission controller 101 determines that a second value, which is greater than the first value, is set as the power supply frequency of the second power transmission signal 512. That is, the power transmission controller 101 reduces the power supply frequency of the second power transmission signal 512 as the power supply frequency of the first wireless power supply apparatus 1A increases, and increases the power supply frequency of the second power transmission signal 512 as the power supply frequency of the first wireless power supply apparatus 1A decreases.

Accordingly, in a case where the power supply frequency of the first wireless power supply apparatus 1A is high, that is, in a case where the power supply period of the first wireless power supply apparatus 1A is long, the power supply frequency of the second power transmission signal 512 is reduced, and the risk of the interference with the wireless system 3 is reduced. In addition, in a case where the power supply frequency of the first wireless power supply apparatus 1A is low, that is, in a case where the power supply period of the first wireless power supply apparatus 1A is short, even if the power supply frequency of the second transmission signal 512 is increased, the risk of the interference with the wireless system 3 is low. Therefore, it is possible to reduce the risk of the interference with the wireless system 3 when the power transmission signals 511 and 512 are transmitted in an overlapping manner.

Note that the information transmitter 102 of the second wireless power supply apparatus 1B may further transmit, to another wireless power supply apparatus 1, power supply information that includes time information indicative of a time at which the second power transmission signal 512 is transmitted.

FIG. 5 shows an example where the second wireless power supply apparatus 1B uses power supply information, which is transmitted by the first wireless power supply apparatus 1A, in order to control the power level of a power transmission signal.

The information transmitter 102 of the first wireless power supply apparatus 1A transmits, to the second wireless power supply apparatus 1B, power supply information that includes power information indicative of the power level of the first power transmission signal 511. The information transmitter 102 transmits the power supply information to the second wireless power supply apparatus 1B, for example, before the second wireless power supply apparatus 1B starts power supply (that is, transmission of the second power transmission signal 512). The power level may be expressed by a value of any one of the antenna power, EIRP and directivity gain of the first power transmission signal 511 or a combination of these values. Generally, the power level is a value which varies according to a direction within the power supply beam forming the first power transmission signal 511. Therefore, power information may include the power levels of each specific angle within the power supply beam. Alternatively, the power information may include a statistical value such as the maximum value, the average value or the median value of the power level according to the direction within the power supply beam.

The information receiver 103 of the second wireless power supply apparatus 1B receives power supply information from the first wireless power supply apparatus 1A. The power transmission controller 101 of the second wireless power supply apparatus 1B determines the power level of the second power transmission signal 512 using the power information included in the received power supply information. Then, the power transmission controller 101 transmits the second power transmission signal 512 at the determined power level.

More specifically, if the power level of the first power transmission signal 511 transmitted by the first wireless power supply apparatus 1A exceeds a threshold value, the power transmission controller 101 reduces the power level of the second power transmission signal 512. If the power level of the first power transmission signal 511 transmitted by the first wireless power supply apparatus 1A is less than or equal to the threshold value, the power transmission controller 101 sets the power level of the second power transmission signal 512 to a value suitable for the power supply to the power receiver 2B (or a predetermined value).

Accordingly, in a case where the power level of the first power transmission signal 511 of the first wireless power supply apparatus 1A is high, the second wireless power supply apparatus 1B can reduce the power level of the second power transmission signal 512 so that the total amount of interference with the wireless system 3 decreases.

Note that the power supply information may include a combination among the direction information, the time information and the power information described above. The information transmitter 102 of the first wireless power supply apparatus 1A transmits the power supply information including, for example, the direction information and the power information to the second wireless power supply apparatus 1B. In this case, the power transmission controller 101 of the second wireless power supply apparatus 1B transmits the second power transmission signal 512 by shifting a direction in which the second power transmission signal 512 has a maximum power (that is, a main beam direction) from the main beam direction of the first power transmission signal 511 of the first wireless power supply apparatus 1A. Accordingly, it is possible to reduce the risk of the first power transmission signal 511 and the second power transmission signal 512 having unintentional interference with the wireless system 3.

In addition, the power supply information may include location information indicative of a location in which the first wireless power supply apparatus 1A is installed. The location information may indicate the absolute coordinates, relative coordinates, building number, room number of the first wireless power supply apparatus 1A.

The information transmitter 102 of the first wireless power supply apparatus 1A transmits the power supply information including, for example, the location information and the power information to the second wireless power supply apparatus 1B. In this case, the power transmission controller 101 of the second wireless power supply apparatus 1B compares the installation location of the first wireless power supply apparatus 1A and the installation location of the second wireless power supply apparatus 1B with each other, and determines whether the risk of the first power transmission signal 511 and the second power transmission signal 512 having unintentional interference with the wireless system 3 is high or not.

More specifically, if the distance between the first wireless power supply apparatus 1A and the second wireless power supply apparatus 1B is less than or equal to a threshold value (for example, several meters) or if the first wireless power supply apparatus 1A and the second wireless power supply apparatus 1B are installed in the same building or the same room, the power transmission controller 101 of the second wireless power supply apparatus 1B determines that the risk of unintentional interference with the wireless system 3 is high. Then, the power transmission controller 101 determines the power level of the second power transmission signal 512 using the power information, and then transmits the second power transmission signal 512. Accordingly, it is possible to reduce the risk of unintentional interference with the wireless system 3.

On the other hand, if the distance between the first wireless power supply apparatus 1A and the second wireless power supply apparatus 1B exceeds the threshold value (for example, several tens of meters) or if the first wireless power supply apparatus 1A and the second wireless power supply apparatus 1B are installed in different buildings or different rooms, the power transmission controller 101 determines that the risk of unintentional interference with the wireless system 3 is low. If the first wireless power supply apparatus 1A and the second wireless power supply apparatus 1B are in different buildings or different rooms, due to an obstacle such as a wall, the first power transmission signal 511 and the second power transmission signal 512 are less likely to influence each other. In such a case, the power transmission controller 101 determines the power level of the second power transmission signal 512 without using the power information (for example, a value suitable for the power supply to the power receiver 2B or a predetermined value), and then transmits the second power transmission signal 512. That is, the second wireless power supply apparatus 1B does not perform control for reducing unintentional interference with the wireless system 3.

Note that the information transmitter 102 of the second wireless power supply apparatus 1B may further transmit, to another wireless power supply apparatus 1, power supply information that includes power information indicative of a power level at which the second power transmission signal 512 is transmitted.

FIG. 6 is a flowchart showing an example of the procedure of power supply information transmission processing executed in the first wireless power supply apparatus 1A.

First, the information transmitter 102 of the first wireless power supply apparatus 1A determines whether it is time for transmitting power supply information or not (step S11). If it is not timing for transmitting power supply information (NO in step S11), the information transmitter 102 returns to step S11, and determines whether it is time for transmitting power supply information or not again.

If it is time for transmitting power supply information (YES in step S11), the information transmitter 102 generates power supply information (step S12). The power supply information indicates at least one of the transmission time, transmission direction and power level of the first power transmission signal 511 which the first wireless power supply apparatus 1A transmits for power supply to the power receiver 2A. The power supply information may further include location information indicative of a location in which the first wireless power supply apparatus 1A is installed. The information transmitter 102 transmits the generated power supply information to the second wireless power supply apparatus 1B (step S13).

By executing the above-described power supply information transmission processing, the first wireless power supply apparatus 1A can transmit, to the second wireless power supply apparatus 1B, the power supply information on the first power transmission signal, which is transmitted by the first wireless power supply apparatus 1A.

Figure 7:
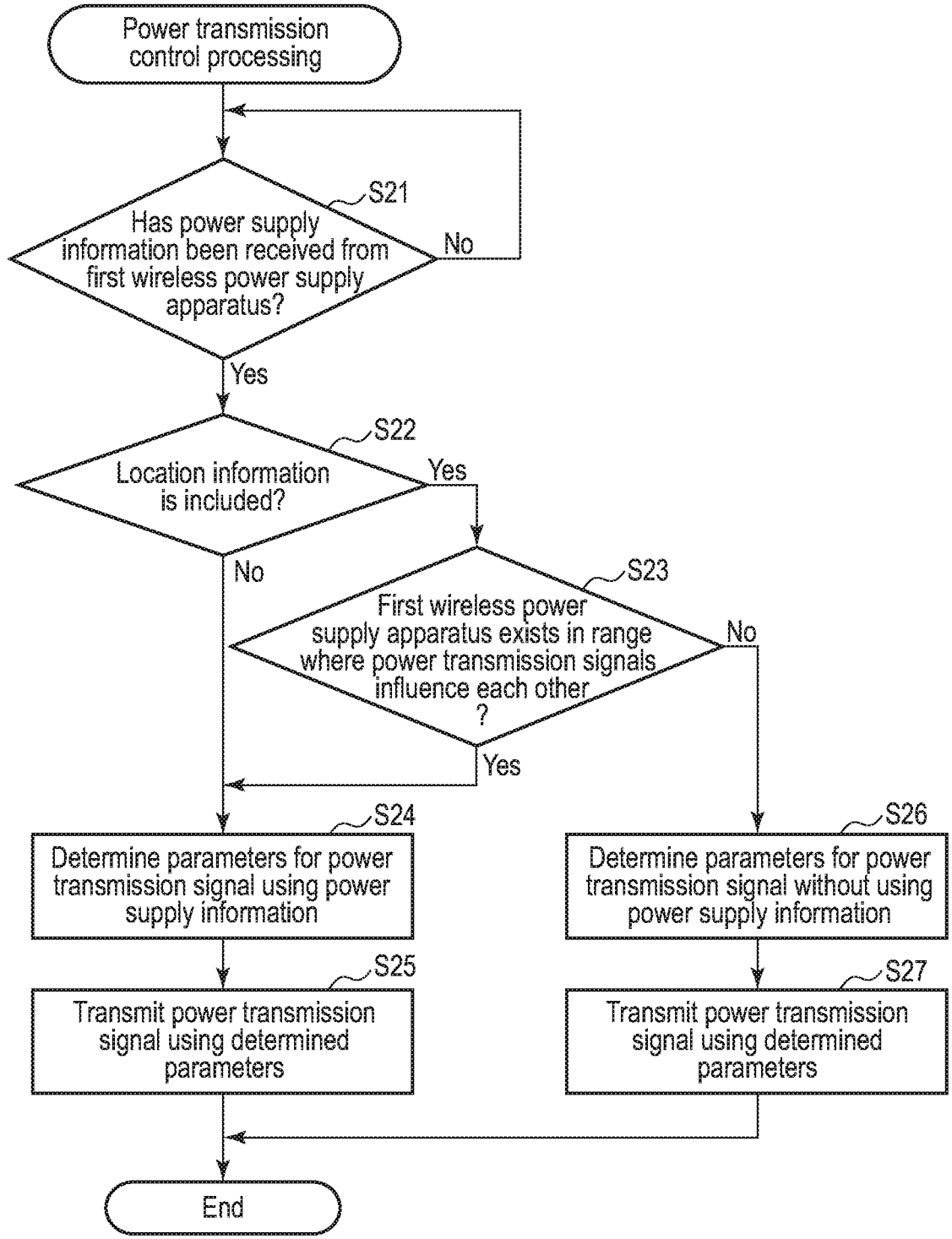
FIG. 7 is a flowchart showing an example of the procedure of power transmission control processing executed in the power supply apparatus of the embodiment.

FIG. 7 is a flowchart showing an example of the procedure of power transmission control processing executed in the second wireless power supply apparatus 1B.

First, the information receiver 103 of the second wireless power supply apparatus 1B determines whether power supply information has been received from the first wireless power supply apparatus 1A or not (step S21). If power supply information has not been received from the first wireless power supply apparatus 1A (NO in step S21), the information receiver 103 returns to step S21, and determines whether power supply information has been received from the first wireless power supply apparatus 1A or not again.

If power supply information has been received from the first wireless power supply apparatus 1A (YES in step S21), the power transmission controller 101 determines whether the power supply information includes location information or not (step S22). As described above, the location information indicates a location in which the first wireless power supply apparatus 1A is installed.

If the power supply information includes location information (YES in step S22), the power transmission controller 101 determines whether the first wireless power supply apparatus 1A exists in a range where the power transmission signals influence each other or not, using the location information (step S23). More specifically, if the location information includes information by which a position at which the first wireless power supply apparatus 1A is installed can be specified (for example, absolute coordinates indicative of a longitude and a latitude or relative coordinates), the power transmission controller 101 determines whether the distance from the second wireless power supply apparatus 1B to the first wireless power supply apparatus 1A is less than a threshold value or not. In addition, if the location information includes information by which a building or a room in which the first wireless power supply apparatus 1A is installed can be specified (for example, a building number or a room number), the power transmission controller 101 determines whether the first wireless power supply apparatus 1A and the second wireless power supply apparatus 1B are installed in different buildings (or different rooms) or not.

If the power supply information does not include the location information (NO in step S22) or if the first wireless power supply apparatus 1A exist in a range where the power transmission signals influence each other (YES in step S23), the power transmission controller 101 determines parameters for the second power transmission signal 512 using the power supply information (step S24). The parameters for the second power transmission signal 512 include, for example, parameters that indicate a direction in which the second power transmission signal 512 is transmitted, a time at which the second power transmission signal 512 is transmitted, and the power level of the second power transmission signal 512, respectively. The power transmission controller 101 may determine all of the parameters for the direction, the time and the power level or some of the parameters using the power supply information. In a case where the power transmission controller 101 determines some of the parameters, the power transmission controller 101 may use predetermined values for the rest of the parameters. For example, in a case where the power transmission controller 101 determines a parameter indicative of the direction of the second power transmission signal 512 using the power supply information, the power transmission controller 101 determines that predetermined parameters should be used for the time and power level of the second power transmission signal 512.

Then, the power transmission controller 101 transmits the second power transmission signal 512 using the determined parameters (step S25). The power transmission controller 101 transmits the second power transmission signal 512 based on, for example, the determined direction, time and power level.

In addition, if the first wireless power supply apparatus 1A does not exist in a range where the power transmission signals influence each other (NO in step S23), the power transmission controller 101 determines parameters for the second power transmission signal 512 without using the power supply information (step S26). The power transmission controller 101 may determine all of the parameters for the direction, time and power level of the second power transmission signal 512 or some of the parameters without using the power supply information. In a case where the power transmission controller 101 determines some of the parameters, the power transmission controller 101 may use predetermined values for the rest of the parameters. In a case where the power transmission controller 101 determines, for example, a parameter indicative of the direction of the second power transmission signal 512, the power transmission controller 101 determines that predetermined parameters should be used for the time and power level of the second power transmission signal 512. Alternatively, the power transmission controller 101 may determine that predetermined parameters should be used for the direction, time and power level of the second power transmission signal 512 instead of determining the parameters indicative of the direction, time and power level of the second power transmission signal 512 in step S26.

Then, the power transmission controller 101 transmits the second power transmission signal 512 using the determined parameters (step S27).

By executing the above-described power transmission control processing, the second wireless power supply apparatus 1B controls the parameters for the second power transmission signal 512 in a case where there is a possibility of the second power transmission signal 512 having interference with the wireless signal transferred in the wireless system 3. Accordingly, it is possible to supply power to the power receiver 2B while reducing unintentional interference with the wireless system 3.

According to the above-described configuration, the first wireless power supply apparatus 1A transmits the power supply information on the first power transmission signal 511 to the second wireless power supply apparatus 1B. The power supply information indicates at least one of the transmission time, transmission direction and power level of the first power transmission signal 511. The second wireless power supply apparatus 1B determines at least the transmission time, transmission direction and power level of the second power transmission signal 512 using the power supply information. Then, the second wireless power supply apparatus 1B transmits the second power transmission signal 512 based on the determined at least one of the time, the direction and the power level. Accordingly, it is possible to avoid or reduce unintentional interference with the wireless system 3 caused by the first power transmission signal 511 and the second power transmission signal 512.

Note that the first wireless power supply apparatus 1A may transmit power supply information to the second wireless power supply apparatus 1B by using one-to-one communication or transmit power supply information to multiple wireless power supply apparatuses including the second wireless power supply apparatus 1B by using one-to-N broadcast communication. In addition, the first wireless power supply apparatus 1A may be configured only to transmit power supply information and the second wireless power supply apparatus 1B may be configured only to receive power supply information. More specifically, for example, the first wireless power supply apparatus 1A comprising the information transmitter 102 but not comprising the information receiver 103 may be configured to transmit power supply information to the second wireless power supply apparatus 1B comprising the information receiver 103 but not comprising the information transmitter 102.

Second Embodiment

In the first embodiment, a wireless power supply apparatus uses power supply information on a power transmission signal, which is transmitted by another wireless power supply apparatus for power supply, in order to control a power transmission signal. On the other hand, in a second embodiment, a wireless power supply apparatus uses wireless system information on a wireless signal, which is received by another wireless power supply apparatus, in order to control a power transmission signal. The wireless signal is a signal transmitted in a wireless system to which these wireless power supply apparatuses do not belong.

The configuration of the wireless power supply apparatus according to the second embodiment is substantially the same as the wireless power supply apparatus 1 of the first embodiment, and the second embodiment is different from the first embodiment in receiving a wireless signal transferred in the wireless system 3 and controlling a power transmission signal using wireless system information indicative of the analysis result of the wireless signal instead of using power supply information. The differences from the first embodiment will be mainly explained below.

Figure 8:
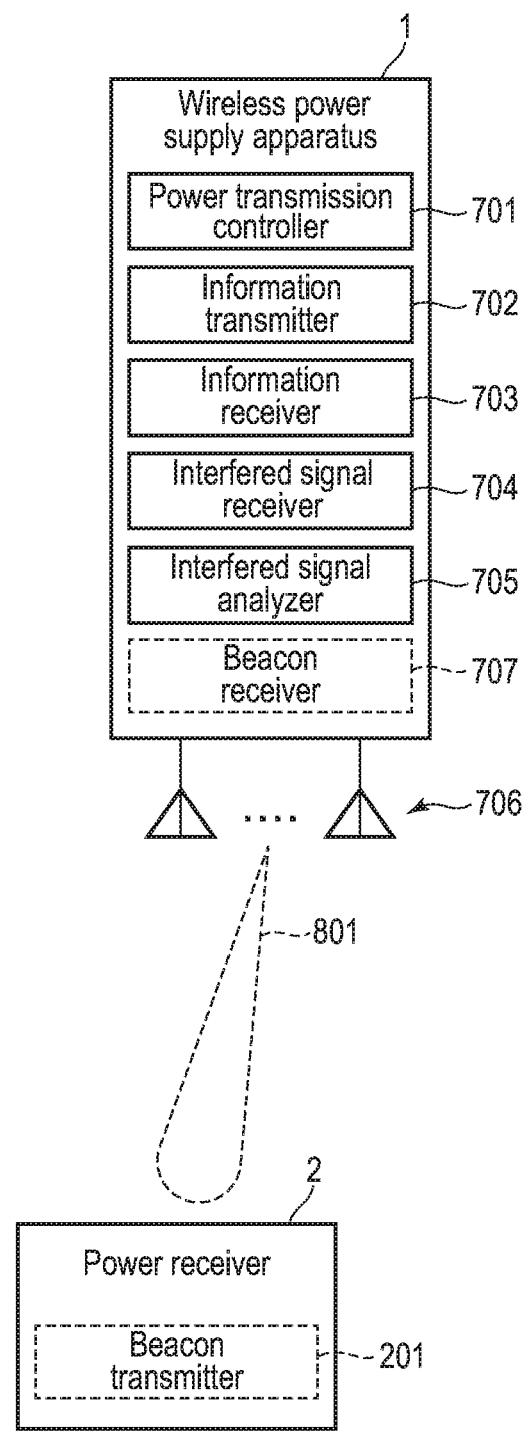
FIG. 8 is a block diagram showing a configuration example of a power supply apparatus according to a second embodiment and a power receiver.

FIG. 8 is a block diagram showing a configuration example of a wireless power supply apparatus 7 according to the second embodiment. The wireless power supply apparatus 7 comprises a power transmission controller 701, an information transmitter 702, an information receiver 703, an interfered signal receiver 704, an interfered signal analyzer 705, and one or more antennas 706. The wireless power supply apparatus 7 may further comprise a beacon receiver 707. The operation of the beacon receiver 707 is substantially the same as the beacon receiver 105 of the first embodiment. Each of these units may be realized as, for example, a circuit. The power transmission controller 701, the information transmitter 702, the information receiver 703, the interfered signal receiver 704, the interfered signal analyzer 705, and the beacon receiver 707 may be disposed in one chip or different chips.

The power transmission controller 701 controls a power transmission signal 801 for supplying power to the power receiver 2. The power transmission controller 701 transmits the power transmission signal 801 via the antennas 706. The power transmission signal 801 is equivalent to a power supply beam formed for the power receiver 2. The details of the power supply beam are as explained in the first embodiment.

The interfered signal receiver 704 receives (detects) a wireless signal transferred in another wireless system (hereinafter also referred to as a second wireless system) via the antennas 706. The wireless power supply apparatus 7 is not a wireless device constituting the second wireless system. That is, the wireless power supply apparatus 7 does not belong to the second wireless system.

As described above, the second wireless system is a system of various types which transfers a wireless signal in the frequency band of the power transmission signal 801 or a frequency band close to it. The second wireless system may be a system for a wireless LAN, an ETC, broadcast, a meteorological radar, amateur radio, satellite communication, a robot, a portable phone, or the like. Therefore, the interfered signal receiver 704 receives a wireless signal which may be interfered with by the power transmission signal 801 (that is, an interfered signal). The interfered signal receiver 704 may receive the wireless signal using an array antenna.

The interfered signal analyzer 705 analyzes the wireless signal received by the interfered signal receiver 704. The interfered signal analyzer 705 analyzes the wireless signal to obtain the signal power, signal format, frequency, and type of the second wireless system in which the wireless signal is transferred, the position and direction of a wireless device in the second wireless system, and the like.

The interfered signal analyzer 705 obtains the received signal level of the received wireless signal or the statistical value such as the smoothed value of the received signal levels, as the signal power of the second wireless system.

The interfered signal analyzer 705 obtains a modulation method, a coding method or the like used in the second wireless system as the signal format of the second wireless system. The interfered signal analyzer 705 may obtain the signal format of the second wireless system by performing demodulation processing on the received wireless signal. For example, in a case where a waveform having a specific shape (for example, a rectangular shape) is obtained or a waveform including a signal constellation (that is, data 0 or data 1) is obtained by performing certain demodulation processing on the wireless signal, the interfered signal analyzer 705 obtains the modulation method used in the demodulation processing as the signal format of the second wireless system. Alternatively, in a case where data verification (or correction) is successful using an error detection/correction code for data obtained by modulation processing, the interfered signal analyzer 705 obtains the signal format of the second wireless system based on the error detection/correction code. The error detection/correction code is, for example, a cyclic redundancy check (CRC) code, a convolutional code, a Reed-Solomon code, a low-density parity-check (LDPC) code, or the like.

The interfered signal analyzer 705 obtains the frequency of the second wireless system by performing frequency analysis processing such as a Fourier transform on the received wireless signal. More specifically, the interfered signal analyzer 705 obtains the frequency spectrum shape, bandwidth, center frequency, or the like of the received wireless signal as the information on the frequency of the second wireless system. Furthermore, the interfered signal analyzer 705 may estimate the type of the second wireless system on the basis of the obtained signal format and/or frequency of the second wireless system. The type of the second wireless system is expressed by, for example, a name or a number (ID) by which the second wireless system can be identified.

The interfered signal analyzer 705 obtains the position of a wireless device (for example, the distance to a wireless device) in the second wireless system by estimating an amount of propagation attenuation based on the received signal level of the received wireless signal. In addition, in a case where the wireless signal is received using an array antenna, the interfered signal analyzer 705 obtains the direction of a wireless device in the second wireless system by estimating a direction from which the wireless signal arrives.

The interfered signal analyzer 705 generates wireless system information on the second wireless system in which the received wireless signal is transferred using this analysis result.

The information transmitter 702 and the information receiver 703 perform wireless communication with another wireless power supply apparatus 7 via the antenna 706. Note that the antenna 706 used for the transmission of the power transmission signal 801 by the power transmission controller 701 and the antenna 706 used for the communication by the information transmitter 702 and the information receiver 703 may be the same as each other or different from each other. Furthermore, the information transmitter 702 and the information receiver 703 may perform wired communication with another wireless power supply apparatus 7. A case where two wireless power supply apparatuses 7 perform wireless communication with each other will be exemplified below.

The information transmitter 702 transmits wireless system information to the other wireless power supply apparatus 7 via the antenna 706. The other wireless power supply apparatus 7 may receive the wireless system information and control the power transmission signal using the received wireless system information. The wireless system information includes at least one of the signal power, signal format, frequency, and type of the second wireless system, and the position (or direction) of the wireless device in the second wireless system.

The information receiver 703 receives the wireless system information from the other wireless power supply apparatus 7 via the antenna 706.

The power transmission controller 701 determines parameters for the power transmission signal 801 using the received wireless system information. The power transmission controller 701 may change parameters which have been used or determine that the parameters should not be changed, by using the wireless system information. The power transmission controller 701 determines, for example, at least one of a first time at which the power transmission signal 801 is transmitted, a first direction in which the power transmission signal 801 is transmitted, a first power level of the power transmission signal 801, and a first frequency band of the power transmission signal 801. Then, the power transmission controller 701 transmits the power transmission signal 801 based on the determined at least one of the first time, the first direction, the first power level, and the first frequency band. That is, the power transmission controller 701 forms the power supply beam, which is equivalent to the power transmission signal 801, on the basis of the determined at least one of the first time, the first direction, the first power level, and the first frequency band.

Some examples where the power transmission signal 801 is controlled according to the type of information included in the wireless system information will be explained.

(Case where Wireless System Information Includes Position Information)

FIG. 9 shows an example where a second wireless power supply apparatus 7B uses wireless system information, which is transmitted by a first wireless power supply apparatus 1A, in order to control the emission direction of a power transmission signal. The wireless power supply apparatuses 7A and 7B have substantially the same configuration as the wireless power supply apparatus 7 described with reference to FIG. 8.

The first wireless power supply apparatus 7A transmits a first power transmission signal 811 to supply power to the power receiver 2A. That is, the first wireless power supply apparatus 7A emits a power supply beam forming the first power transmission signal 811, to the power receiver 2A.

In addition, the second wireless power supply apparatus 7B transmits a second power transmission signal 812 to supply power to the power receiver 2B. That is, the second wireless power supply apparatus 7B emits a power supply beam forming the second power transmission signal 812, to the power receiver 2B.

In addition, the first wireless power supply apparatus 7A transmits wireless system information on another wireless system 3 to the second wireless power supply apparatus 7B. The wireless system 3 is composed of, for example, wireless devices 31, 32 and 33 which may transmit and receive wireless signals. The second wireless power supply apparatus 7B controls the second power transmission signal 812 using the received wireless system information.

More specifically, the information transmitter 702 of the first wireless power supply apparatus 7A transmits wireless system information including, for example, the position information of the wireless device 31 in the wireless system 3 to the second wireless power supply apparatus 7B. The information transmitter 702 transmits the wireless system information to the second wireless power supply apparatus 7B, for example, before the second wireless power supply apparatus 7B starts power supply (that is, transmission of the second power transmission signal 812). The position information indicates at least one of the position (for example, coordinates) of the wireless device 31 and the direction toward the wireless device 31 (for example, an azimuth angle and/or an elevation angle).

The information receiver 703 of the second wireless power supply apparatus 7B receives the wireless system information from the first wireless power supply apparatus 7A. The power transmission controller 701 of the second wireless power supply apparatus 7B determines the emission direction of the second power transmission signal 812 such that the emission direction of the second power transmission signal 812 becomes different from the direction from the second wireless power supply apparatus 7B toward the wireless device 31, using the position information included in the received wireless system information. Then, the power transmission controller 701 transmits the second power transmission signal 812 in the determined emission direction. Since the second wireless power supply apparatus 7B transmits the second power transmission signal 812 in the direction different from the direction toward the wireless device 31, as compared with a case where a power transmission signal 813 is transmitted in the direction toward the wireless device 31, unintentional interference with the wireless system 3 can be reduced or avoided.

Note that, in a case where the power receiver 2B to which the second wireless power supply apparatus 7B supplies power is located in the same direction as the wireless device 31, from the perspective of supplying as high energy as possible to the power receiver 2B by the second power transmission signal 812, the second power transmission signal 812 is preferably transmitted in the direction toward the wireless device 31. In such a case, the power transmission controller 701 of the second wireless power supply apparatus 7B determines the emission direction of the second power transmission signal 812 which is shifted slightly (for example, at several degrees) from the direction toward the wireless device 31 such that the emission direction of the second power transmission signal 812 will not perfectly match the direction toward the wireless device 31. Alternatively, the power transmission controller 701 may determine the emission direction of the second power transmission signal 812 such that the emission direction of the second power transmission signal 812 becomes different from the direction toward the wireless device 31, and also expand the coverage of the second power transmission signal 812 by decreasing the directivity of the second power transmission signal 812 (that is, the directivity of the power supply beam forming the second power transmission signal 812). Accordingly, even if the emission direction of the second power transmission signal 812 is shifted from the direction toward the power receiver 2B, the second wireless power supply apparatus 7B can still supply power to the power receiver 2B.

Note that the interfered signal receiver 704, the interfered signal analyzer 705 and the information transmitter 702 of the second wireless power supply apparatus 7B may transmit wireless system information to the first wireless power supply apparatus 7A or another wireless power supply apparatus 7. The wireless power supply apparatus 7 which receives this wireless system information may control a power transmission signal similarly.

(Case where Wireless System Information Includes Information on Signal Power)

As described above, the interfered signal analyzer 705 of the first wireless power supply apparatus 7A obtains the received signal level of the wireless signal received by the interfered signal receiver 704 or the statistical value such as the smoothed value of the received signal levels, as the signal power of the wireless system 3. The information transmitter 702 of the first wireless power supply apparatus 7A transmits the wireless system information including the information on the signal power to the second wireless power supply apparatus 7B.

The information receiver 703 of the second wireless power supply apparatus 7B receives the wireless system information from the first wireless power supply apparatus 7A. The power transmission controller 701 of the second wireless power supply apparatus 7B determines at least one of the transmission time and power of the second power transmission signal 812 using the information on the signal power included in the received wireless system information.

More specifically, the power transmission controller 701 determines whether or not to perform control of the second power transmission signal 812 for avoiding interference with the wireless system 3. For example, if the received signal level is less than a threshold value, the power transmission controller 701 determines that control of the second power transmission signal 812 for avoiding interference with the wireless system 3 should not be performed. This is because it is estimated that the wireless device 31 in the wireless system 3 is located far enough and the risk of interference is low.

On the other hand, if the received signal level is greater than or equal to the threshold value, the power transmission controller 701 determines that control of the second power transmission signal 812 for avoiding interference with the wireless system 3 should be performed. This is because it is estimated that the wireless device 31 in the wireless system 3 is located close and the risk of interference is high. In this case, the power transmission controller 701 reduces the power level of the second power transmission signal 812. Alternatively, the power transmission controller 701 reduces the directivity of the second power transmission signal 812 and widens the power supply beam. Accordingly, the energy density of the second power transmission signal 812 is reduced.

Alternatively, the power transmission controller 701 may delay transmission of the second power transmission signal 812 until the information on the signal power of the wireless system 3 is not received or until the received signal level indicated by the received information on the signal power becomes less than or equal to the threshold value. Accordingly, occurrence of interference with the wireless system 3 is avoided. The threshold value for the determination based on the received signal level may be determined on the basis of an interference level tolerable in a wireless system 3 which is assumed beforehand or may be determined on the basis of an environment in which the wireless power supply apparatuses 7A and 7B are installed. For example, in a case where a widely-used wireless system using a frequency band close to frequency bands that is used by the wireless power supply apparatuses 7A and 7B operates, a tolerable interference level defined in this wireless system 3 is used as the threshold value. Alternatively, a power level calculated using this tolerable interference level may be used as the threshold value. For example, in a case where the first wireless power supply apparatus 7A (that is, a wireless supply apparatus which receives a wireless signal transferred in the wireless system 3) is installed in a building having a wall formed of a material having a large amount of propagation attenuation of electromagnetic waves, the threshold value may be reduced by the assumed amount of attenuation by the wall. The wall formed of a material having a large amount of propagation attenuation of electromagnetic waves is, for example, a reinforced concrete wall. A propagation environment other than a wall may be considered or a margin may be added.

(Case where Wireless System Information Includes Information on Signal Format, Frequency or Type)

As described above, the interfered signal analyzer 705 obtains a signal format such as a modulation method or a coding method used in the wireless system 3 by performing demodulation processing on the received wireless signal. The interfered signal analyzer 705 obtains the frequency (for example, frequency spectrum shape, band width, center frequency, or the like) of the wireless system 3 by performing frequency analysis processing such as a Fourier transform on the received wireless signal. Furthermore, the interfered signal analyzer 705 may estimate the type of the wireless system 3 on the basis of the obtained signal format and/or frequency of the wireless system 3.

The information transmitter 702 of the first wireless power supply apparatus 7A transmits wireless system information including, for example, at least one of the signal format and frequency of the wireless system 3 to the second wireless power supply apparatus 7B.

The information receiver 703 of the second wireless power supply apparatus 7B receives the wireless system information from the first wireless power supply apparatus 7A. The power transmission controller 701 of the second wireless power supply apparatus 7B estimates the type of the wireless system 3 on the basis of at least one of the signal format and the frequency included in the received wireless system information. More specifically, the power transmission controller 701 may estimate, for example, whether the wireless system 3 is a wireless LAN system including a mobile station for which a license is not required or a broadcast system including a fixed station for which a license is provided, or the like.

Then, the power transmission controller 701 determines at least one of the transmission time, transmission direction, power level, and frequency of the second power transmission signal 812 such that the interference with the wireless system 3 is avoided or reduced, in accordance with the estimated type of the wireless system 3. More specifically, since the tolerable interference level is defined for the type of the wireless system 3, the power transmission controller 701 determines the power level of the second power transmission signal 812 such that the power level of the second power transmission signal 812 satisfies the tolerable level. Alternatively, the power transmission controller 701 determines the frequency of the second power transmission signal 812 such that the frequency of the second power transmission signal 812 does not overlap the frequency defined for the type of the wireless system 3. The power transmission controller 701 transmits the second power transmission signal 812 at the determined power level or frequency.

Note that the estimation of the type of the wireless system 3 may be performed not in the second wireless power supply apparatus 7B but in the first wireless power supply apparatus 7A. In that case, the information transmitter 702 of the first wireless power supply apparatus 7A transmits the wireless system information including information on the estimated type of the wireless system 3 to the second wireless power supply apparatus 7B. Then, the power transmission controller 701 of the second wireless power supply apparatus 7B controls the second power transmission signal 812 such that the interference with the wireless system 3 is avoided or reduced using the information on the type of the wireless system 3 included in this wireless system information.

Figure 10:
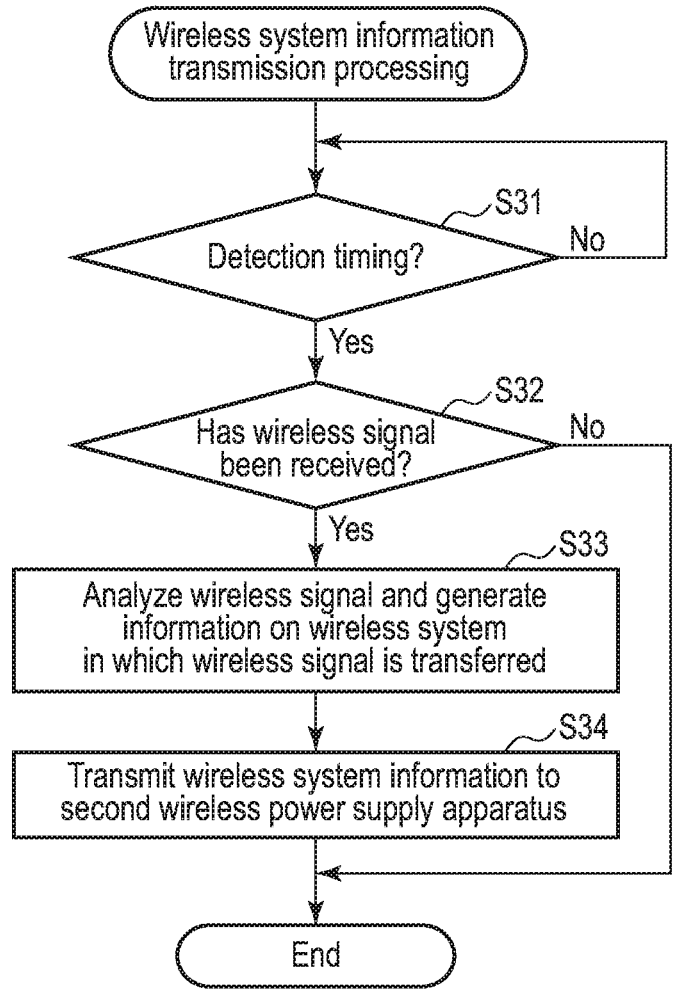
FIG. 10 is a flowchart showing an example of the procedure of wireless system information transmission processing executed in the power supply apparatus of the embodiment.

FIG. 10 is a flowchart showing an example of the procedure of wireless system information transmission processing executed in the first wireless power supply apparatus 7A.

First, the interfered signal receiver 704 of the first wireless power supply apparatus 7A determines whether or not it is time for detecting a wireless signal (step S31). If it is not time for detecting a wireless signal (NO in step S31), the interfered signal receiver 704 returns to step S31, and determines whether or not it is time for detecting a wireless signal again.

If it is time for detecting a wireless signal (YES in step S31), the interfered signal analyzer 705 determines whether the interfered signal receiver 704 has received a wireless signal or not (step S32). The wireless signal is a signal transferred in the wireless system 3. The first wireless power supply apparatus 7A, and the second wireless power supply apparatus 7B to which wireless system information is to be transmitted, do not belong to the wireless system 3. The wireless signal may be an interfered signal which is interfered with by the power transmission signals 811 and 812 transmitted by the first wireless power supply apparatus 7A and the second wireless power supply apparatus 7B.

If a wireless signal has been received (YES in step S32), the interfered signal analyzer 705 analyzes the wireless signal and generates wireless system information (step S33). The wireless system information indicates, for example, at least one of the received signal level of the wireless signal, the type of the wireless system 3, and the position and direction of the wireless device 31, 32 or 33 which transmits the wireless signal. The information transmitter 702 transmits the generated wireless system information to the second wireless power supply apparatus 7B (step S34).

On the other hand, if a wireless signal has not been received (NO in step S32), the interfered signal analyzer 705 ends the wireless system information transmission processing. Alternatively, the information transmitter 702 may transmit wireless system information indicating that a wireless signal is not received, to the second wireless power supply apparatus 7B.

By executing the above-described wireless system information transmission processing, the first wireless power supply apparatus 7A can transmit, to the second wireless power supply apparatus 7B, wireless system information on the wireless system 3 in which a wireless signal is transferred.

FIG. 11 is a flowchart showing an example of the procedure of power transmission control processing executed in the second wireless power supply apparatus 7B.

First, the information receiver 703 of the second wireless power supply apparatus 7B determines whether wireless system information has been received from the first wireless power supply apparatus 7A or not (step S41). If wireless system information has not been received from the first wireless power supply apparatus 1A (NO in step S41), the information receiver 703 returns to step S41, and determines whether wireless system information has been received from the first wireless power supply apparatus 7A or not again.

If wireless system information has been received from the first wireless power supply apparatus 7A (YES in step S41), the power transmission controller 701 determines whether the received signal level of a wireless signal received in the first wireless power supply apparatus 7A exceeds a threshold value or not using the wireless system information (step S42). If the received signal level of the wireless signal exceeds the threshold value (YES in step S42), the power transmission controller 701 determines parameters for the second power transmission signal 812 using the wireless system information (step S43). The parameters for the second power transmission signal 812 may include, for example, parameters indicative of a direction in which the second power transmission signal 812 is transmitted, a time at which the second power transmission signal 812 is transmitted, the power level of the second power transmission signal 812, and the frequency of the second power transmission signal 812, respectively. The power transmission controller 701 may determine all of the parameters for the direction, time, power level, and frequency, or some of the parameters using the wireless system information. Note that, in a case where the power transmission controller 701 determines some of the parameters, the power transmission controller 701 may use predetermined values for the rest of the parameters. For example, in a case where the power transmission controller 701 determines a parameter indicative of the direction of the second power transmission signal 812 using the wireless system information, the power transmission controller 701 determines that predetermined parameters should be used for the time, power level and frequency of the power transmission signal.

More specifically, the power transmission controller 701 determines at least one of the direction, time, power level, and frequency of the power transmission signal on the basis of at least one of a position and a direction where the wireless device 31, 32 or 33 in the wireless system 3 exists. In addition, the power transmission controller 701 may determine at least one of the direction, time, power level, and frequency of the power transmission signal on the basis of the type of the wireless system 3. Alternatively, the power transmission controller 701 may determine at least one of the direction, time, power level, and frequency of the power transmission signal on the basis of the received signal level of the wireless signal. Furthermore, the power transmission controller 701 may determine at least one of the direction, time, power level, and frequency of the power transmission signal on the basis of an combination among at least one of a position and a direction where the wireless device 31, 32 or 33 exists, the type of the wireless system 3, and the received signal level of the wireless signal.

Then, the power transmission controller 701 transmits the power transmission signal using the predetermined parameters (step S44). The power transmission controller 701 transmits the power transmission signal based on, for example, the determined direction, time, power level, and frequency.

In addition, if the received signal level of the wireless signal is less than or equal to the threshold value (NO in step S42), the power transmission controller 701 determines the parameters for the power transmission signal without using the wireless system information (step S45). The power transmission controller 701 may determine all of the parameters for the direction, time, power level, and frequency of the power transmission signal or some of the parameters without using the wireless system information. Note that, in a case where the power transmission controller 701 determines some of the parameters, the power transmission controller 701 may use predetermined values for the rest of the parameters. In a case where the power transmission controller 701 determines, for example, a parameter indicative of the direction of the power transmission signal without using the wireless system information, the power transmission controller 701 determines that predetermined parameters should be used for the time, power level and frequency of the power transmission signal. Alternatively, instead of determining the parameters for the direction, time, power level, and frequency of the power transmission signal in step S45, the power transmission controller 701 may determine that predetermined parameters should be used for the direction, time, power level, and frequency of the power transmission signal.

Then, the power transmission controller 701 transmits the power transmission signal using the determined parameters (step S46).

By executing the above-described power transmission control processing, the second wireless power supply apparatus 7B controls the parameters for the second power transmission signal 812 in a case where there is a possibility of the second power transmission signal 812 having interference with the wireless signal transferred in the wireless system 3. Accordingly, it is possible to supply power to the power receiver 2B while reducing unintentional interference with the wireless system 3.

According to the above-described configuration, the first wireless power supply apparatus 7A transmits wireless system information on the other wireless system 3 to the second wireless power supply apparatus 7B. The wireless system information includes at least one of the signal power, signal format, frequency, and type of the wireless system 3, and the position (or direction) of the wireless device 31 in the wireless system 3. The second wireless power supply apparatus 7B controls at least one of the transmission time, transmission direction, power level, and frequency of the second power transmission signal 812 using this wireless system information. Then, the second wireless power supply apparatus 7B transmits the second power transmission signal 812 based on the determined at least one of the time, the direction, the power level, and the frequency. Accordingly, it is possible to avoid or reduce unintentional interference with the wireless system 3 caused by the second power transmission signal 812.

Note that the first wireless power supply apparatus 7A may transmit wireless system information to the second wireless power supply apparatus 7B by using one-to-one communication or may transmit wireless system information to multiple wireless power supply apparatuses including the second wireless power supply apparatus 7B by using one-to-N broadcast communication.

In addition, the first wireless power supply apparatus 7A may be configured only to transmit wireless system information, and the second wireless power supply apparatus 7B may be configured only to receive wireless system information. More specifically, for example, the first wireless power supply apparatus 7A comprising the information transmitter 702 but not comprising the information receiver 703 may be configured to transmit wireless system information to the second wireless power supply apparatus 7B comprising the information receiver 703 but not comprising the information transmitter 702.

Furthermore, the wireless power supply apparatuses 7A and 7B may further comprise the configuration of the wireless power supply apparatus 1 of the first embodiment. In that case, for example, the first wireless power supply apparatus 7A combines power supply information and wireless system information and transmits them to the second wireless power supply apparatus 7B. The second wireless power supply apparatus 7B may control the transmission time, transmission direction, power level, frequency, and the like of the second power transmission signal 812 using the received power supply information and wireless system information.

As explained above, according to the first and second embodiments, interference with the other wireless system 3 can be reduced. The information receiver 103 of the wireless power supply apparatus 1 receives, from the other (second) wireless power supply apparatus 1, power supply information on the second power transmission signal, which is transmitted by the second wireless power supply apparatus 1 for power supply. By using this power supply information, the power transmission controller 101 determines at least one of the first time at which the first power transmission signal is transmitted, the first direction in which the first power transmission signal is transmitted, and the first power level of the first power transmission signal, and transmits the first power transmission signal based on the determined at least one of the first time, the first direction and the first power level. Accordingly, it is possible to avoid or reduce unintentional interference with the wireless system 3 while supplying power to the power receiver 2.

In addition, the information receiver 703 of the first wireless power supply apparatus 7A receives, from the other (second) wireless power supply apparatus 7B, wireless system information on the wireless system 3, which is a wireless system to which the wireless power supply apparatus 7A and the second wireless power supply apparatus 7B do not belong and a wireless system in which a wireless signal received by the second wireless power supply apparatus 7B is transferred. By using this wireless system information, the power transmission controller 701 determines at least one of the first time at which the first power transmission signal is transmitted, the first direction in which the first power transmission signal is transmitted, the first power level of the first power transmission signal, and the first frequency band of the first power transmission signal, and transmits the first power transmission signal based on the determined at least one of the first time, the first direction, the first power level, and the first frequency band. Accordingly, it is possible to avoid or reduce unintentional interference with the wireless system 3 while supplying power to the power receiver 2.

Each of the various functions disclosed in the first and second embodiments may be realized by a circuit (processing circuit). An example of the processing circuit includes a programed processor such as a central processing unit (CPU). This processor executes each of the functions by executing a computer program (instructions) stored in a memory. This processor may be a microprocessor including an electric circuit. Examples of the processing circuit include a digital signal processor (DSP), an application specific integrated circuit (ASIC), a microcontroller, a controller, and other electric circuit components. Each of the components other than the CPU disclosed in these embodiments may also be realized by a processing circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power supply system comprising:
a first power supply apparatus; and
a second power supply apparatus,
wherein:
the first power supply apparatus comprises:
a first receiver configured to receive a wireless signal that is exchanged in a wireless system to which neither the first power supply apparatus nor the second power supply apparatus belongs, the wireless system being provided separately from the power supply system and being a wireless system other than a power supply system;
an analyzer configured to analyze the wireless signal and generate information on the wireless system, the information on the wireless system including at least one of a signal format and a type of the wireless system in which the wireless signal is exchanged, or a position and direction of a wireless device in the wireless system, and the signal format indicating at least one of a modulation method or a coding method; and
a transmitter configured to transmit the information on the wireless system to the second power supply apparatus,
the second power supply apparatus comprises:
a power transmission controller configured to transmit a power transmission signal for power supply; and
a second receiver configured to receive the information on the wireless system from the first power supply apparatus, and
the power transmission controller is configured to:
determine at least one of a transmission time at which the power transmission signal is to be transmitted, a transmission direction in which the power transmission signal is to be transmitted, a power level of the power transmission signal to be transmitted, or a frequency of the power transmission signal to be transmitted, using the information on the wireless system; and
transmit the power transmission signal based on the determined at least one of the transmission time, the transmission direction, the power level, or the frequency.

2. The power supply system according to claim 1, wherein the first power supply apparatus further comprises a power transmission controller configured to transmit a power transmission signal for power supply based on the information on the wireless system.

3. The power supply system according to claim 1, wherein the information on the wireless system further includes at least one of signal power or frequency.

4. The power supply system according to claim 1, wherein:
the information on the wireless system comprises information indicative of at least one of the position or the direction where the wireless device in the wireless system exists, and
the power transmission controller is configured to determine the transmission direction based on the at least one of the position or the direction.

5. The power supply system according to claim 1, wherein:
the information on the wireless system comprises information indicative of the type of the wireless system, and
the power transmission controller is configured to determine at least one of the transmission time, the transmission direction, the power level, or the frequency based on the type.

6. The power supply system according to claim 1, wherein:
the information on the wireless system comprises information indicative of a received signal level of the wireless signal received by the first receiver, and
the power transmission controller is configured to determine at least one of the transmission time or the power level based on the received signal level.

7. The power supply system according to claim 1, wherein:
the information on the wireless system comprises information indicative of a received signal level of the wireless signal received by the first receiver, and
the power transmission controller is configured to determine at least one of the transmission time or the power level when the received signal level exceeds a threshold value.

8. The power supply system according to claim 1, wherein the type of the wireless system one of a wireless LAN, an electronic toll collection system (ETC), broadcast, a meteorological radar, amateur radio, satellite communication, a robot, and a portable phone.

9. The power supply system according to claim 1, wherein the wireless system is a wireless communication system.

* * * * *